United States Patent

[11] 3,611,830

| [72] | Inventor | Harry C. Shank<br>Lake Villa, Ill. |
|---|---|---|
| [21] | Appl. No. | 873,176 |
| [22] | Filed | Nov. 3, 1969 |
| [45] | Patented | Oct. 12, 1971 |
| [73] | Assignee | Ammco Tools, Inc.<br>North Chicago, Ill. |

[54] SILENCER BAND
3 Claims, 4 Drawing Figs.

[52] U.S. Cl. ..................................................... 74/574,
82/DIG. 9, 188/1 B
[51] Int. Cl. ......................................................... F16f 15/12
[50] Field of Search............................................. 74/574;
188/1 B; 82/4 A, 1 C, DIG. 9; 77/58.2; 301/5 B

[56] References Cited
UNITED STATES PATENTS

| 1,846,257 | 2/1932 | Huck..................... | 188/1 B UX |
| 2,941,631 | 6/1960 | Fosberry et al. .............. | 74/574 X |

*Primary Examiner*—William F. O'Dea
*Assistant Examiner*—F. D. Shoemaker
*Attorney*—Fidler, Bradley & Patnaude ABSTRACT: Device for dampening vibrations in a workpiece during a grinding operation performed thereon includes a plurality of lead blocks positionable directly against the workpiece and a spring-loaded flexible band for holding the blocks against the workpiece.

PATENTED OCT 12 1971
3,611,830
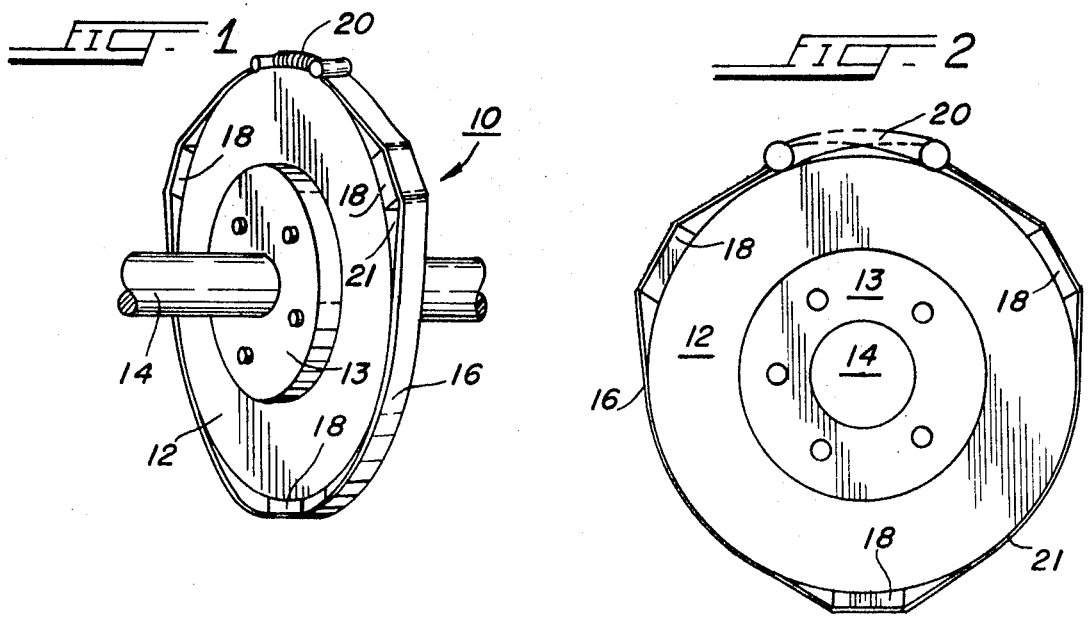
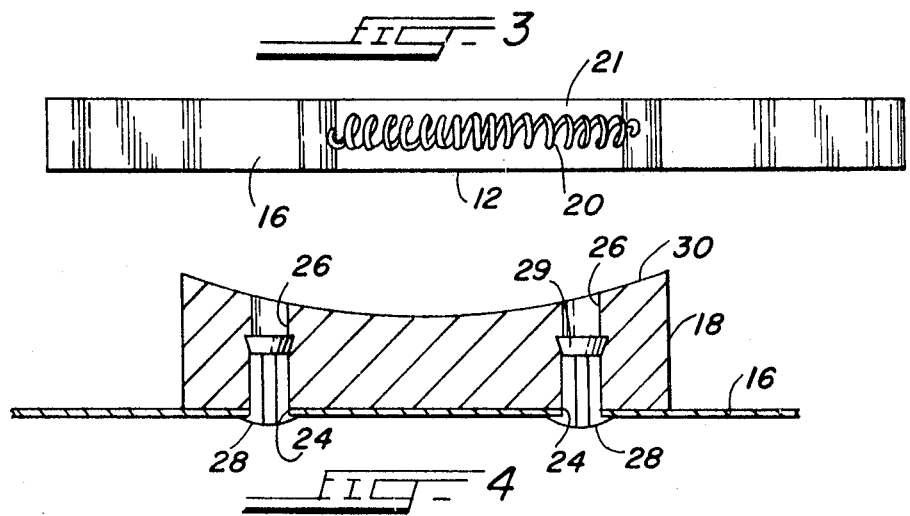
INVENTOR.
HARRY C. SHANK
BY Fidler, Bradley & Putnam
ATTYS.

SILENCER BAND

The present invention generally relates to grinding equipment, and it relates more particularly to a new and improved device for reducing vibrations in a workpiece during a grinding operation.

Brake discs and clutch plates have large facial surfaces which are adapted to be frictionally engaged by a cooperating member which is rotatable relative thereto. It is important that the facial surface or surfaces of such clutch plates and brake discs be exceedingly smooth and flat, and this is ordinarily accomplished in a grinding or other metal removal operation wherein a tool piece engages and thereby abrades the surface of the disc. The common practice is to mount the clutch plate or brake disc on the arbor of a lathe and to rotate it at a high angular velocity. Inasmuch as clutch plates and brake discs are relatively thin in their cross-sectional dimension as compared to their relative radii, vibration of the plate or disc, as the case may be, generally occurs thereby making it difficult if not impossible to provide a true, planar surface thereon. Moreover, the noise generated by such discs during grinding is objectionable.

There is disclosed in U.S. Pat. No. 3,345,884 a magnetic device for suppressing vibration in a brake disc or the like during grinding. That device is held by a plurality of permanent magnets against one face of the disc while the opposite face is being ground. In many instances, however, it is advantageous to simultaneously grind or otherwise work on both faces of the disc wherefore that device cannot be used.

A principal object of the present invention is, therefore, to provide a new and improved method and apparatus for suppressing vibration of a workpiece during metal removal operation.

Another object of this invention is to provide a new and improved method and means for dampening vibrations in a thin member during a grinding or machining operation thereon.

A further object of this invention is to provide a new and improved device for attenuating or entirely eliminating vibration of a thin plate during simultaneous grinding or machining of the opposite faces thereof.

Briefly, the above and further objects may be realized by holding a plurality of lead blocks tightly against the rim of the disc or other workpiece during surface grinding or machining thereof. For this purpose, the blocks, at least three in number, are secured to a flexible band to the ends of which is attached a spring thereby to form a generally circular band. In use, the band is stretched over the disc and released so that the lead blocks rest directly against the rim of the disc. The band thus rotates with the disc during the machining operation leaving both surfaces of the disc exposed.

Further objects and advantages and a better understanding of the present invention may be had by reference to the following detailed description taken in connection with the accompanying drawing, wherein:

FIG. 1 is a perspective view of the device of the present invention in use on a thin disc;

FIG. 2 is a plan view showing the device of the present invention in use on a thin disc;

FIG. 3 is a top view of the device shown in FIG. 2; and

FIG. 4 is an enlarged cross-sectional view showing one of the lead blocks attached to the flexible band.

Referring now to the drawings, the attenuating or silencer band 10 of the present invention is shown in FIGS. 1, 2 and 3 in its operative position on the rim of a brake disc 12, the hub 13 of which is mounted on a shaft 14 for rotating the disc 12 during machining or grinding of the opposite facial surfaces thereof. The band 10 includes a strip 16 of flexible material such as steel and a plurality of lead blocks 18 are suitably mounted on the inner surface thereof. The ends of the band 16 are interconnected by means of a coil spring 20 so that the overall device 10 can be stretched over the rim 21 of the workpiece 12 and released, whereby the blocks 18 are held directly and tightly against the rim 21 of the disc 12. It will be apparent from inspection of FIG. 1 that the faces of the disc 12 are left exposed for machining or grinding thereof.

While any suitable means may be used for attaching the blocks 18 to the strap 16, in a preferred embodiment of the present invention the strap 16 is provided with a plurality of apertures 24 and the blocks 18 are each provided with a pair of holes 26 which are adapted to be aligned with the holes 24. With each block 18 thus in place on the band 16, pop rivets 28 are inserted through the holes 24 into the bores 26 and the end portions 29 of the rivets are then expanded into the walls of the bore 26. Since lead is relatively soft, this is a convenient way of tightly securing the lead blocks 18 to the band 16.

As best shown in FIG. 4, the blocks 18 have a concave-rim-engaging face 30 whose radius is substantially equal to the radius of the workpiece with which the band 10 is to be used. However, it has been found that this radius is not critical and that the device works satisfactorily where the wheel radius is substantially larger or smaller than the radius of the recess 30.

In the process of developing the present invention, applicant tried various means for reducing vibrations in a thin disc during surface grinding or machining thereof. For example, the use of harder metals such as iron in place of the lead blocks 18 was tried, unsuccessfully. Lead shot was mounted in a rubber tube and stretched onto the rim of the disc but this did not noticeably reduce vibrations. Also, a thin sheet of resilient material, rubber, was placed over the concave surface 30 of the lead blocks so that the lead did not touch directly against the disc. Again, the device was unsuccessful. When, however, lead blocks were used and placed directly against the workpiece and fixedly held there as by means of the band and spring arrangement constituting a preferred embodiment of this invention, the device worked remarkably well in completely eliminating all vibration in the workpiece so that no objectionable noise was generated and a good smooth surface was achieved on the discs.

The device 10 of the present invention has been used successfully within a range of cut velocity between 150 and 600 ft. per min. with a disc velocity up to 200 r.p.m. The blocks were approximately one-half inch by one-half inch by 3 inches.

It is believed that certain other materials such as Babbitt, bismuth, platinum and lead will also reduce vibration if held directly against the workpiece during the metal-removing operation.

What I claim is:

1. Apparatus for use in dampening vibrations in a thin, rotating disc, comprising
    a resilient ring having a stretched diameter exceeding the diameter of said disc and an unstretched diameter less than the diameter of said disc, and
    a plurality of pieces of lead secured to the inner side of said ring in mutually spaced-apart relationship,
    whereby said pieces of lead may be held against the circumferential edge of said disc by said resilient ring.

2. The invention according to claim 1 wherein at least three lead pieces are provided.

3. Apparatus according to claim 1 wherein said resilient ring comprises
    a substantially unstretchable, flexible band, and
    a tension spring interconnected between the ends of said band,
    said lead pieces being blocks having a concave-disc-engaging inner surface and being secured to the flexible band portion of said ring.